United States Patent Office
2,927,851
Patented Mar. 8, 1960

2,927,851
ACIDIC FERTILIZER-CONTAINING SLAG
Harold W. Wilson, El Paso, Tex.
No Drawing. Application March 19, 1958
Serial No. 722,385
9 Claims. (Cl. 71—62)

This invention relates to the production of a fertilizing material for calcareous (alkaline) soils and it has for its special object to provide a fertilizing material of high equivalent acidity in such form that the product is not used up and decomposed immediately after being taken into the soil, that the plant nutrients contained therein are released at a low rate for use of plants growing in the soil, and that the product is non-toxic and beneficial to the soil in more than one manner insofar as it will not merely neutralize the alkalinity of the soil because of its acid character, but will add other beneficial results to the one mentioned.

The product in addition is low in cost and is easily applied when used in conventional distribution equipment.

The invention is based on the discovery that slags from a reverberatory copper refining process, when treated with concentrated acids such as concentrated sulfuric or concentrated phosphoric acid or with so-called alkylation acids or with a mixture of the acids above mentioned in the absence of water yield a product which has an equivalent acidity of 15% to 75%, dependent upon the quantities of slag, acid and water used, and which has essentially the qualities above enumerated. If chemical fertilizers are dissolved in the water which is added to the slag the product, in addition to the equivalent acidity it adds to the soil, contains all those plant nutrients which have been added to the slag in their most effective state.

It has already been proposed to use slag derived from an iron refining process as a fertilizer and to treat the slag with just enough dilute acid to dissolve it, so that it can produce plant nutrients, when added to the soil. Further it has been proposed to use very dilute acid solutions in connection with slag derived from an iron refining process in order to dissolve silicic acid and to eliminate gel formation. These proposals provide however only plant nutrients which are of benefit for a very short time.

In contradistinction to this proposal, the invention is based on the treatment of slag with a high iron content (up to 35%)—which is solely available when the extracted metal is not iron—with a concentrated acid in the presence of water so as to promote hydrolysis of the silicates and acid solubilization of the iron and other metals which are present in the slag. Use of a highly concentrated acid, as distinguished from use of a highly diluted acid, is an essential characteristic of the invention. In this way hydrous silicates, silicic acid, and metal sulfates or phosphates, according to the acid used, are produced forming a system in which the silica has been converted into hydrous silicates and then into silicic acid, partially through the effect of the iron, which is present in metallic form and as ferrous oxide, being oxidized. This reaction is highly exothermic and, due to the development of heat, a large part of the water which is present in the system is expelled, leaving a silica gel structure which, as well known, has very high adsorptive properties. Therefore it adsorbs large quantities of the metal sulfates or phosphates and uncombined acid. The product thus obtained has a well defined gelatinous structure and is highly friable. Exposure of the product to an atmosphere of low relative humidity or to an artificially heated atmosphere dries the product and converts it into a kind of powder or into an aggregation of small lumps with a moisture content of approximately 10% to 15%.

The gel structure of the mass with its high adsorptive qualities holds all the materials which are contained in the mass and which are to be given up to the soil in a state of readiness for slow liberation through progressive decomposition. This also applies to the plant nutrients which may have been introduced into the water added to the slag. Tests conducted with such a product to which such plant nutrients have been added show that only part of these plant nutrients are immediately available while the remainder are available only over extended periods. In the end however 100% of the nutrients are given up to the soil.

The reaction of the system may be summarized as follows:

Slag containing metallic Fe, FeO and silicates of

Fe, Al, Ca, Mg, Mn, Zn, Mo, B $+H_2SO_4+M_2O \rightarrow$
$xH_2SiO_3.xFeSO_4.H_2SO_4$.metal sulfates.$H_2SO_4.H_2O+H_2O\uparrow$ Becomes:

$SiO_2.FeSO_4.H_2SO_4.H_2O.$(Ca, Mg, Al,
　　　　　　　　　　　　　Mn, Zn . . .)$SO_4.H_2SO_4+H_2O\uparrow$ Soil reaction:

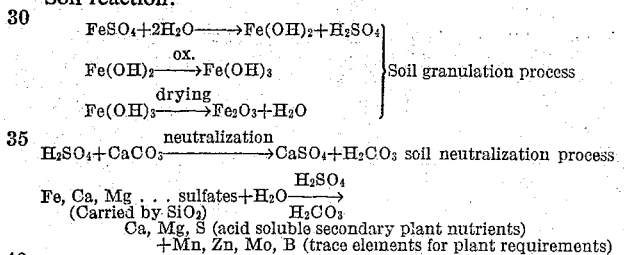

$$H_2SO_4+CaCO_3 \xrightarrow{neutralization} CaSO_4+H_2CO_3 \text{ soil neutralization process}$$

Fe, Ca, Mg . . . sulfates$+H_2O \xrightarrow{H_2SO_4}$
(Carried by $SiO_2$)　　　$H_2CO_3$
　Ca, Mg, S (acid soluble secondary plant nutrients)
　　+Mn, Zn, Mo, B (trace elements for plant requirements)

Example 1 part by weight of concentrated sulfuric acid is added to 2 parts by weight of water which contains one part by weight of pulverized slag. These are mixed thereby obtaining a semi-solid, gelatinous product, which when exposed to the atmosphere or to artificial drying loses most of all moisture present to become a dry solid material containing physically bound water soluble iron salts of sulfuric acid, sulfato-iron acid, sulfuric acid, silicic acid salts, and trace amounts of metallic elements.

In the process described above, phosphoric acid may be substituted for, or may be used in conjunction with sulfuric acid. The ratio between acid, slag, and water may be varied considerably in both directions depending upon the final chemical composition which is aimed at.

The acid is either concentrated sulfuric acid with a concentration of 90% to near 100% or phosphoric acid with a concentration of 70% to 85%, as above mentioned, or a mixture of both. Further, so-called "alkylation acid" may be used which furnishes a product essentially not different from the product obtained by means of the above named acids or acid mixtures.

Alkylation acid is a so-called spent or waste sulfuric acid, obtained after use in petroleum refining products or for acid alkylation. Its composition is as follows: 90% to 93% sulfuric acid, 3% to 5% water, 3% to 5% of hydrocarbons, polymerized and non-polymerized. Further it contains very small quantities of ketones, aldehydes, and other organic oxygen compounds, sulfonic acids and related sulfur compounds.

In the reaction with alkylation acid the organic matter of the acid in no way interferes with the process while at the same time the product which contains minor quantities of organic matter is more easily soluble in water, as the entrapped or adsorbed organic matter acts as a wetting agent by its capability of acting as a surfactant.

The slag, as already mentioned, is a slag obtained from the reverberatory refining process of copper. It contains metallic iron from 15% to 35%, $SiO_2$ 25% to 30%; CaO 9% to 10%; aluminum oxide 6% to 7%; magnesium oxide, 1½% to 2%; zinc, 2% to 3% but sometimes only 0.5%; copper, about 0.4%, and manganese oxide 1%, sulfur about 0.6%, lead about 0.5% and trace amounts of Mo, B, Ni, and Cd. The copper slag is cooled in different ways in the refineries. Some copper refineries cool the slag by mixing it with water which produces a very rapid cooling or quenching. The slag of the reverberatory copper refining process may thus be a quenched or a non-quenched slag. The use of quenched or rapidly cooled slag results in a much more rapid reaction during acid treatment. A ratio of equal parts of slag and acid in the presence of a quantity of water twice as large causes gel formation in a matter of 15 to 20 seconds. If air-cooled non-quenched slag is used and a ratio of 4 parts of slag to 2 parts of acid and 3 parts of water is selected, a ratio which also produces satisfactory results, a gel formation is produced only after 1½ minutes.

The physical states of the products obtained by means of quenched or water-cooled slags and non-quenched or air-cooled slags are different, although a chemical analysis of the gel shows no difference. When quenched slag is used the product loses about 90% of its water in 72 hours. It forms a light fluffy material. An air-cooled slag however reacts with the acid to produce a more granular product which is compact and for some uses is preferable.

As above stated a chemical analysis on many samples and ratios of weight quantities of slag, acid and water does not reveal a substantial difference. Based on using equal weights of acid and slag, quenched slag contains after acid treatment about 34% of total acid, calculated to sulfuric acid and containing about 10% of iron calculated to metallic iron. Air-cooled, non-quenched slag contained after treatment with acid about 32% of total acid calculated to sulfuric acid and about 12% of iron, calculated to metallic iron.

The difference in the physical arrangement of the elements manifests itself in the fact that quenched slag shows a crystalline structure which allows more rapid solubilization of the slag, while non-quenched slag shows a lower degree of crystal structure and the slag reacts more slowly when treated with acid.

With respect to the drying stage of the process above mentioned, it may be emphasized that the products obtained can in fact be used immediately after they have been formed. Drying is not necessary as the products are solid gels immediately upon reaction. Drying is only performed for marketing purposes. It is clear that only in rare cases the product is used near the place where it is manufactured. As the product must therefore be shipped or conveyed to the place where it is used the moisture (5% to 10%) is eliminated in order to reduce the weight which has to be conveyed.

As above stated plant nutrients may be added to the water. Water containing chemical compounds, producing such fertilizer compounds, may also partially replace the water and the amount of water used must take into account the water which is furnished by these additions.

Fertilizer compounds are mostly nitrogen, phosphorus and potassium. Thus ammonium sulphate, diammonium phosphate, urea and other nitrogen containing compounds may be used. The phosphorus may be supplied by using phosphoric acid either alone or in conjunction with sulfuric acid. Potassium may be supplied in the form of any soluble salt, for instance potassium chloride may be used.

By variation of the quantities of acid, slag, water and chemical compounds containing the nitrogen, phosphorus and potassium a large variety of soil amendments and soil amendments containing plant nutrient products may be manufactured. Such products have by virtue of their production process high equivalent acidities and they contain water soluble iron sulfates. They are thus capable of exercising a reclamation action on soils of the calcareous type.

A product made by means of the above described process exercises a strong neutralizing effect when applied to calcareous (alkaline) soil by virtue of the high acid equivalents. Further the fact that silica gel is formed containing a metal salt and some of the nutrients by adsorption produces a fertilizing substance which acts as a kind of storehouse retaining the beneficial substances and giving them off slowly only to the extent to which decomposition of the basic material in the soil occurs. The novelty of applicant's process therefore resides in the fact that the substances producing the soil amendment and containing the plant nutrients is produced as a reaction of the concentrated acid with the slag in the presence of water which promotes hydrolysis of the silicates present in the slag resulting in the formation of hydrous silicates, and silicic acid, the metal sulfates appearing as silica gel adsorbates.

Water solubility studies have shown that the products made from this process are able to remain in the soil for longer periods of time without being leached out of reach of plant roots when compared with more conventional types of soil conditioners or chemical fertilizers.

Soil improvement based upon the swelling and shrinking capacity of both the iron hydroxide (formed in the soil) and the silica gel has been observed where the product has been applied to the calcareous type soils. The binding capacity of the hydrous silicates in combination with the silica gel helps to hold the organic matter as well as plant nutrients in their place especially in soils which are high in sand content. The above described process thus furnishes a new and useful class of materials for soil amendment. The products formed in the slag-acid-water system are only formed because of the hydrolysis of the silicates of the slag; a silica gel is formed, capable of exercising a very high adsorptive capacity so that not only the metallic salts formed in the reaction are adsorbed, but also large amounts of uncombined acid used in the process. The high equivalent acidity which is displayed by the product is due both to the uncombined acid and to the acid of the metallic salts. Further on account of the origin of the slag the secondary and trace elements required for plant growth are found in the finished product. By virtue of the combined reactions in the soil of the iron, the silica gel, and some aluminum oxide, the product is capable of effecting soil granulation and of improving water penetration properties of the soil.

Further by virtue of the comparatively low cost of the ingredients used to make the product, and of the simplicity of manufacture, the product may be economically used as a soil conditioning product and has very distinct advantages over the known products of this type which base their corrective properties solely upon their iron and equivalent acidity.

It will be understood that the proportions stated in the example are only to be taken as referring to one of the many examples of ratios which will be actually effective. Other ratios have been tested and have been found similarly effective. It is therefore clear that the exact ratio of the weight of acid, water and slag and may be varied and that also other changes and additions may be made without in any way departing from the essence of the invention such as defined by the annexed claims.

Having described the invention what is claimed is:

1. A process for making a soil fertilizing and soil improving gel product which comprises: treating a slag with a concentrated acid in the presence of a limited amount of water; wherein the slag is one obtained from the process of refining copper in a reverberatory furnace and therefore is one having a substantial content of metallic iron; and the concentrated acid is selected from the group consisting of sulfuric acids having a strength of at least 90% and phosphoric acids having a strength greater than 70%; the weight of water being not greater than the total weight of the slag and the acid; and therefore insufficient to dissolve the resulting product; whereby a solid hydrated siliceous gelatinous product is produced and some of the water present is evolved from the mixture as a consequence of the exothermic reaction which is produced by bringing said slag and said acid together in the presence of said limited amount of water.

2. A process for making a soil fertilizing and soil improving gel product which comprises: treating a slag with a concentrated acid in the presence of a limited amount of water to which plant nutrients have previously been added; wherein the slag is one obtained from the process of refining copper in a reverberatory furnace and therefore is one having a substantial content of metallic iron; and the concentrated acid is selected from the group consisting of sulfuric acids having a strength of at least 90% and phosphoric acids having a strength greater than 70%, the weight of the water to which plant nutrients have previously been added, being not greater than the total weight of the slag and the acid, and therefore insufficient to dissolve the resulting product; whereby a solid hydrated siliceous gelatinous product is produced and some of the water present is evolved from the mixture as a consequence of the exothermic reaction which is produced by bringing said slag and said acid together in the presence of a limited amount of water.

3. A process for making a soil fertilizing and soil improving gel product which comprises: treating a water-quenched slag with a concentrated acid in the presence of a limited amount of water; wherein the water-quenched slag is one obtained by water quenching a slag obtained from the process of refining copper in a reverberatory furnace and therefore is a slag having a substantial content of metallic iron; and the concentrated acid is selected from the group consisting of sulfuric acids having a strength of at least 90% and phosphoric acids having a strength greater than 70%; the relative proportions of slag to acid to water being about 1:1:2 by weight; whereby a solid hydrated siliceous gelatinous product is produced and some of the water present is evolved from the mixture as a consequence of the exothermic reaction which is produced by bringing said slag and said acid together in the presence of a limited amount of water.

4. A process for making a soil fertilizing and soil improving product which comprises: treating an air-cooled slag with a concentrated acid in the presence of a limited amount of water; wherein the air-cooled slag is one obtained by air cooling a slag obtained from the process of refining copper in a reverberatory furnace and therefore is a slag having a substantial content of metallic iron; and the concentrated acid is selected from the group consisting of sulfuric acids having a strength of at least 90% and phosphoric acids having a strength greater than 70%; the relative proportions of slag to acid to water being about 4:2:3 by weight; whereby a solid hydrated siliceous gelatinous product is produced and some of the water present is evolved from the mixture as a consequence of the exothermic reaction which is produced by bringing said slag and said acid together in the presence of a limited amount of water.

5. A process for making a soil fertilizing and soil improving gel product which comprises: treating a slag with a concentrated acid in the presence of a limited amount of water; wherein the slag, obtained from the process of refining copper in a reverberatory furnace, contains between 15% and 35% by weight of iron, 25% to 30% of silica, 9% to 10% calcium oxide, 6% to 7% alumina, 1.5 to 2% magnesia, 0.5 to 2% zinc, and copper, lead, manganese and sulfur in quantities smaller than 1% and traces of molybdenum, nickel and cadmium; and the concentrated acid is selected from the group consisting of sulfuric acids having a strength of at least 90% and phosphoric acids having a strength greater than 70%; the weight of water being not greater than the total weight of the slag and the acid, and therefore insufficient to dissolve the resulting product; whereby a solid hydrated siliceous gelatinous product is produced and some of the water present is evolved from the mixture as a consequence of the exothermic reaction which is produced by bringing said slag and said acid together in the presence of a limited amount of water.

6. The process of claim 5 wherein the water contains ammonium sulfate and potassium chloride, added before said treatment is effected.

7. The solid dry gelatinous hydrous silicate soil improving and soil fertilizing product formed by treating a slag with a concentrated acid in the presence of a limited amount of water; wherein the slag is one obtained from the process of refining copper in a reverberatory furnace and therefore is one having a substantial content of metallic iron; and the concentrated acid is selected from the group consisting of sulfuric acids having a strength of at least 90% and phosphoric acids having a strength greater than 70%; the weight of water being not greater than the total weight of the slag and the acid; and therefore insufficient to dissolve the resulting product; whereby a solid hydrated siliceous gelatinous product is produced and some of the water present is evolved from the mixture as a consequence of the exothermic reaction which is produced by bringing said slag and said acid together in the presence of said limited amount of water.

8. The solid dry gelatinous hydrous silicate soil improving and soil fertilizing product formed by treating a slag with a concentrated acid in the presence of a limited amount of water containing soluble plant nutrients; wherein the slag is one obtained from the process of refining copper in a reverberatory furnace and therefore is one having a substantial content of metallic iron; and the concentrated acid is selected from the group consisting of sulfuric acids having a strength of at least 90% and phosphoric acid having a strength greater than 70%; the weight of water containing said soluble plant nutrients being not greater than the total weight of the slag and the acid; and therefore insufficient to dissolve the resulting product; whereby a solid hydrated siliceous gelatinous product is produced and some of the water present is evolved from the mixture as a consequence of the exothermic reaction which is produced by bringing said slag and said acid together in the presence of said limited amount of water containing soluble soil improving and soil fertilizing compounds.

9. A method of improving calcareous soil which consists in incorporating into the soil a dried gelatinous hydrous silicate product having an acid content of approximately 32%–34%, calculated to sulfuric acid, and containing metal adsorbates including iron to the extent of 10% and further containing soluble nitrogen, phosphorus and potassium compounds, said dried gelatinous product making its fertilizing components available slowly upon decomposition to produce a soil improvement which is of long duration.

References Cited in the file of this patent

UNITED STATES PATENTS

| | | |
|---|---|---|
| 327,256 | Haas | Sept. 29, 1885 |
| 2,288,874 | Anderson et al. | July 7, 1942 |

FOREIGN PATENTS

| | | |
|---|---|---|
| 456,362 | Italy | Apr. 1, 1950 |
| 494,112 | Italy | May 17, 1954 |